United States Patent [19]

Donahue, Jr.

[11] Patent Number: 4,889,316
[45] Date of Patent: Dec. 26, 1989

[54] METHOD AND DEVICE FOR QUICK CONNECTION AND DISCONNECTION OF A SOLENOID OPERATED VALVE TO A REFRIGERATOR WITH AN ICEMAKER

[75] Inventor: William R. Donahue, Jr., West Lafayette, Ind.

[73] Assignee: Emhart Industries, Inc., Indianapolis, Ind.

[21] Appl. No.: 185,786

[22] Filed: Apr. 25, 1988

[51] Int. Cl.⁴ ............... F16K 27/00; F16K 31/06; F25C 5/18
[52] U.S. Cl. .................. 251/129.15; 62/340; 137/374; 29/428
[58] Field of Search ............ 251/129.15; 137/374; 312/236; 62/340; 29/428

[56] References Cited

U.S. PATENT DOCUMENTS 3,775,994 12/1973 Linstromberg et al. ......... 62/340 X
3,835,661 9/1974 Kochendorfer et al. ............ 62/340

Primary Examiner—Arnold Rosenthal
Attorney, Agent, or Firm—Carl A. Forest

[57] ABSTRACT

A quick connect/disconnect solenoid operated valve providing simultaneous electrical and fluid connections to a refrigerator with an icemaker.

8 Claims, 2 Drawing Sheets

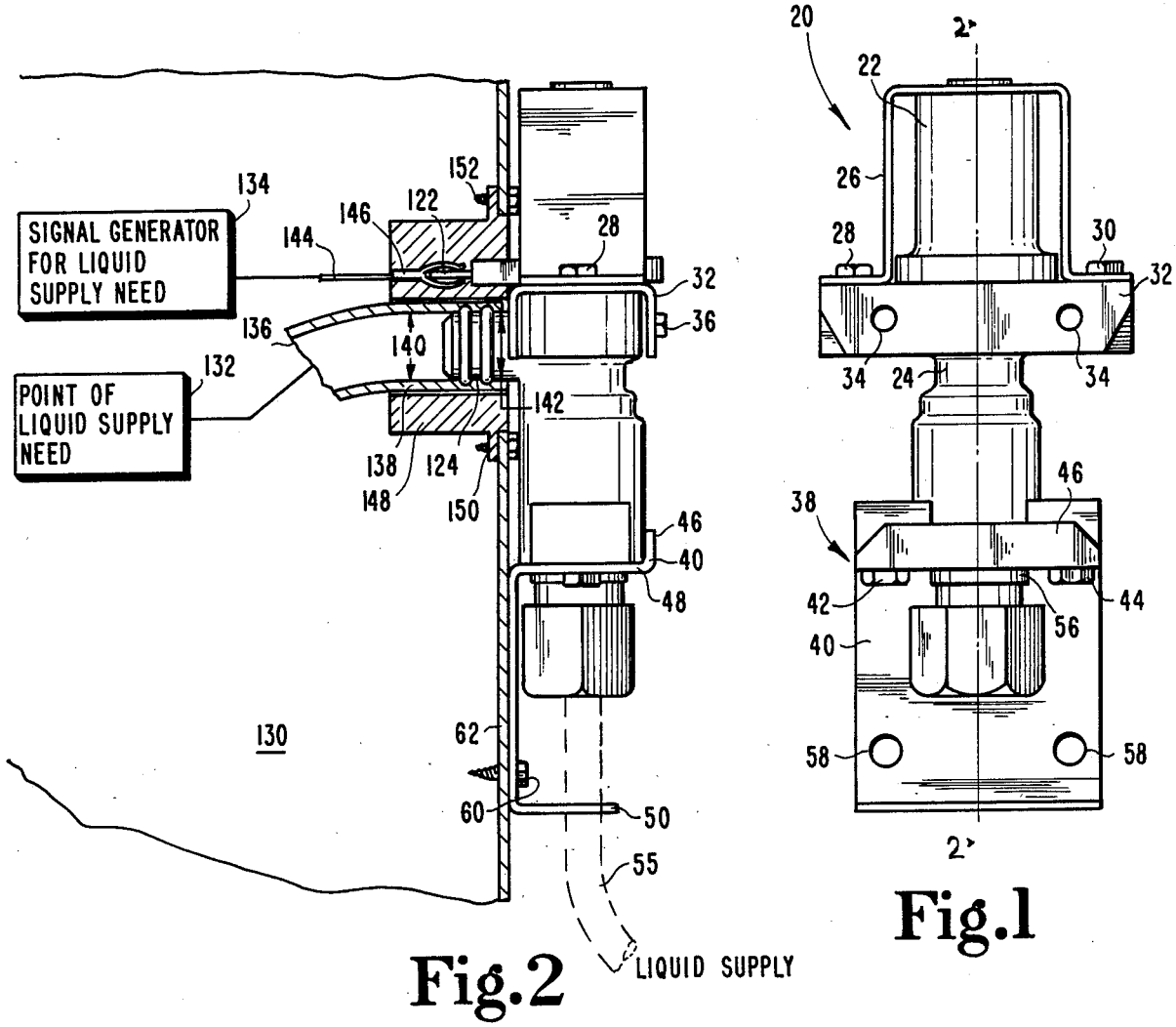

METHOD AND DEVICE FOR QUICK CONNECTION AND DISCONNECTION OF A SOLENOID OPERATED VALVE TO A REFRIGERATOR WITH AN ICEMAKER

BACKGROUND OF THE INVENTION

This invention relates to a method and device for quick connection and disconnection of a solenoid operated valve to a refrigerator with an icemaker, and more particularly to a device and a method which uses the device which has a fluid connector and an electrical connector which are in the same fixed spatial relationship as the fluid connector and electrical connector of the refrigerator.

Refrigerators with icemakers require an intermittent supply of liquid in order to carry out their functions. It is common to supply these appliances with electrical circuitry which will send an electrical impulse to open a solenoid operated valve to allow water to flow for filling the icemaker, and which will send a different electrical signal to close the solenoid operated valve to cut off the water when the icemaker is filled. Occasionally, the solenoid operated valve ceases to function due to clogging from particulate matter suspended in the liquid supply or for other reasons. In the event that the solenoid operated valve ceases to operate, the electrical liquid supply circuitry must be disconnected from the valve body and the liquid supply lines must be disconnected from the valve body separately. Then, much as during assembly, the liquid supply conduit must be connected to a new valve body and the electrical liquid supply circuitry must be connected to a new valve body. Thus, the installation and replacement of a solenoid operated valve may be a time consuming procedure. The present invention embodies a method and device for quick connection and disconnection of a solenoid operated valve to an icemaker by providing a valve body which allows for the electrical and liquid supply connections to be made simultaneously.

Various devices relating to solenoid operated valves and to simultaneous connection of electrical and fluid connectors are disclosed by the following group of patent references.

| Patentee | Pat. No. |
|---|---|
| Meakin | 2,510,125 |
| Goepfrich | 2,619,986 |
| Darling | 2,621,875 |
| Collins | 3,035,611 |
| Beckett et al. | 3,111,139 |
| Finck | 3,140,073 |
| Allen | 3,265,352 |
| Valinskie | 3,673,541 |
| Mullally | 4,570,904 |

Meakin discloses a connector which allows for simultaneous connection of fluid and electrical lines. Nowhere does Meakin disclose or suggest that half of the fluid and electrical connector can be integrally formed to a solenoid valve body for an icemaker.

Goepfrich discloses a solenoid operated valve for use in beverage dispensing machines which allows for quick connection and disconnection of the fluid flow portion of the valve assembly to allow for cleaning or replacement thereof. The fluid flow portion of the valve assembly is also disconnectable from the solenoid portion of the valve. Thus, in the Goepfrich design the solenoid portion of the valve stays connected to the machines and the electrical contacts controlling the solenoid portion remain connected. Thus, Goepfrich does not provide for simultaneous connection of the fluid supply and electrical contacts of a solenoid operated valve as is done by the present invention. Therefore, should the armature of the Goepfrich valve become struck or the solenoid fail to operate properly to open and close the valve, it would be necessary to remove the solenoid portion which is not provided with a quick disconnect design.

Darling discloses a combined fluid connector and electrical connector for use by pilots. The electrical connectors disclosed therein are not used to operate a solenoid operated valve which selectively opens and closes the fluid supply lines as is required in a valve for an icemaker.

Collins discloses a solenoid operated valve with quick disconnect electrical connectors. Collins provides quick disconnection for detaching the wiring between the plunger housing and manifold housing and between the solenoidal wiring and electrical source supply. Collins nowhere discloses nor suggests the combination of quick disconnect electrical connectors in combination with quick disconnect fluid connectors to allow for simultaneous connection of the fluid supply to the electrical water requirement signal means of an appliance requiring intermittent water supply.

Finck discloses a solenoid operated valve with conductor prongs to serve as plug-in circuit terminals of the solenoid windings. Finck also discloses conduit fittings which are removable and replaceable by manipulation of the fittings while the solenoid's movable valve parts remain intact to the appliance. Due to the construction of the Finck apparatus, it would be impossible to simultaneously connect the electrical contacts and fluid conduits to an appliance as is possible with the present invention.

Beckett et al. discloses a solenoid operated valve which when connected to a manifold, provides simultaneous fluid connection and electrical connections. The Beckett et al. device requires that the mating surfaces of the valve and the manifold be machined for accurate contact and that a gasket be placed therebetween. The present invention eliminates the need for close machining of mating surfaces and the need for an additional gasket between those surfaces.

Allen discloses a solenoid operated valve which may be connected to a subplate in a manner so that the electrical connections and fluid connections are made simultaneously. It appears that the Allen device would require close machining between the mating faces of the subplate and the valve body as well as possibly a gasket to prevent fluid leakage. As previously stated, the present invention eliminates the need for the close machining and additional gasket.

Valinskie discloses a composite electrical and fluid connector for quickly and easily detachably connecting electrical circuits and fluid conduits. Valinskie nowhere discloses nor suggests that a portion of the connector could be a portion of a solenoid operated valve.

Mullally discloses a solenoid valve that provides for fluid connection with the elimination of gasket by providing O-rings about an extension so that the valve can be inserted directly into a transmission. Mullally does not disclose simultaneous fluid and electrical connections.

SUMMARY OF THE INVENTION

This invention is an improved solenoid operated valve assembly for use with a refrigerator with an icemaker having a liquid supply connector in the appliance, connected to the sight of liquid requirement. There is an electrical connector in the appliance connected to the electrical liquid requirement indicator means for providing an electrical signal during the period when the appliance requires a liquid, the electrical connector being in a fixed spacial relationship to the liquid supply connector. There is also a valve body having a liquid supply intake connectable to a supply of liquid. The liquid supply output connector is designed and arranged to sealingly connect with the liquid supply connector of the appliance, the liquid supply output connector being connected to a liquid path connecting the output connector to the liquid supply intake. A solenoid operated valve is movably positioned in the fluid path to open and close the fluid path. A second electrical connector electrically communicating with the solenoid operated valve so that an electrical signal received by the electrical connector will supply an impulse to cause the valve to selectively open and close the fluid path, the second electrical connector being electrically connectable to the first electrical connector, the second electrical connector being in a second fixed spacial relationship to the liquid supply intake connector such that the second fixed spacial relationship is the same as the first fixed spacial relationship. The liquid supply connector is connected to the liquid supply output connector and the first electrical connector is connected to the second electrical connector.

This invention is a method of providing a solenoid operated valve for a refrigerator with an icemaker having the steps of providing a refrigerator with an icemaker and a liquid connector in a fixed spacial relationship to an electrical connector, both of which communicate with the icemaker, and providing a solenoid operated valve with a second liquid connector in the same fixed spacial relationship to a second electrical connector as the fixed spacial relationship of the connectors in the refrigerator, simultaneously connecting the liquid connectors and the electrical connectors.

It is an object of this invention to provide a solenoid operated valve which allows for simultaneous connection of the fluid connector and the electrical circuitry for the solenoid which controls fluid passage trough the fluid connector.

It is also an object of this invention to provide a valve which eliminates the need for gaskets between the mating faces of the valve and the appliance to which it is to be attached.

Another object of this invention is to provide a plug-in type solenoid operated valve for use in appliances which require intermittent water supply.

It is a further object of this invention to reduce replacement time of solenoid operated valves in refrigerators with icemakers and to readily facilitate assembly of such appliances.

Related objects and advantages of the present invention will be apparent from the following description.

BRIEF DESCRIPTION OF THE INVENTION

FIG. 1 is a front view of a plug-in type solenoid operated valve for an appliance according to the present invention.

FIG. 2 is a partially schematic, partially fragmentary cross-sectional side view of a valve according to the present invention along lines 2—2 of FIG. 1, representing the valve attached to an appliance requiring intermittent liquid supply.

DESCRIPTION OF THE PREFERRED EMBODIMENT

Figure 4:
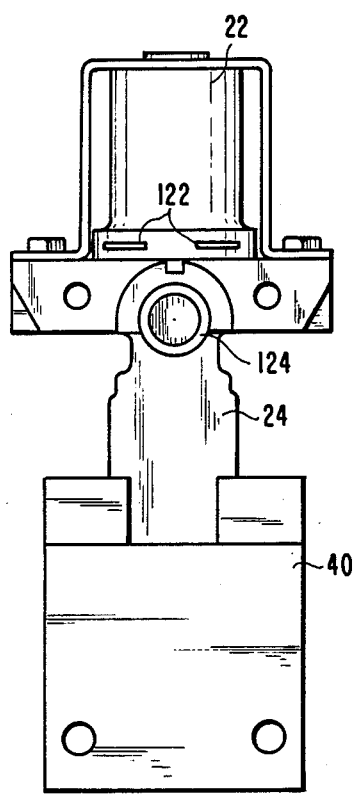
FIG. 4 is a back view of the valve of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Figure 3:
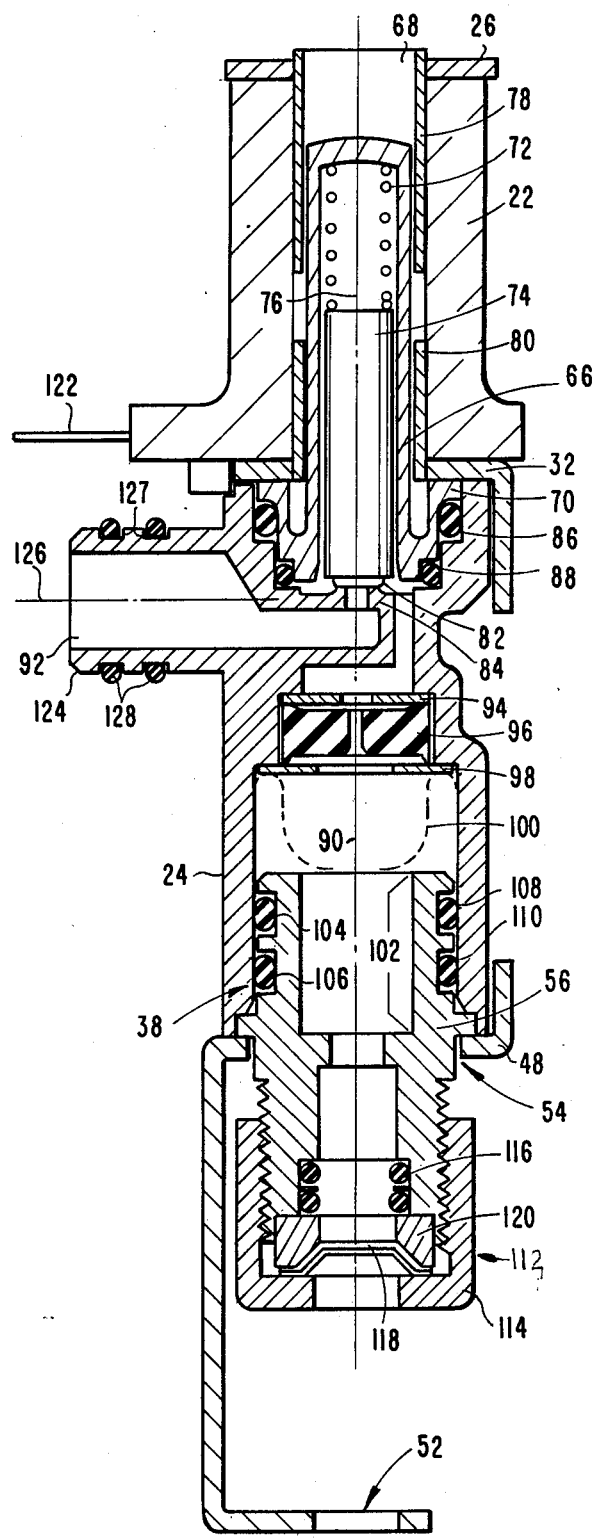
FIG. 3 is a cross-sectional view of a valve according to the present invention along lines 2—2 of FIG. 1.

Referring to FIG. 1, there is illustrated a plug-in solenoid operated valve 20 which is designed to be connected to a refrigerator with an icemaker. Valve 20 has a solenoid coil 22 which is secured to the valve body 24 by a U-shaped frame 26 and screws or other appropriate linear fasteners 28 and 30. Linear fasteners 28 and 30 pass through a plate 32 disposed between the coil 22 and valve body 24 (see FIG. 3). This plate 32 is L-shaped in part (see FIG. 3) and U-shaped in part (see FIG. 2) and has a pair of attachment holes 34 sized to receive linear fasteners 36 (see FIG. 2) such as screws, which will help to secure the valve 20 to the refrigerator. On the opposite end 38 of the valve body 24 from the coil 22, is a relief bracket 40 which is secured to the valve body by screws 42 and 44. As can be seen in FIGS. 1, 2 and 3, relief bracket 40 is generally C-shaped with an upwardly extending flange 46 connected to the top leg 48 of the C-shaped bracket. The bottom leg 50 of the U-shaped bracket 40 has a hole 52 (see FIG. 3) extending therethrough of sufficient size to allow a water supply line 55 (see FIG. 2) to extend therethrough. The top leg 48 of the U-shaped bracket 40 also has a hole 54 extending through it. Hole 54 is sized to encompass the inlet 56 to the valve body 24. A pair of attachment holes 58 are provided in the relief bracket 40 to allow for the relief bracket to be secured by screws 60 (FIG. 2 (only one shown)) to the wall 62 of the refrigerator. Relief bracket 40 therefore serves not only as a mounting bracket for the valve 20, but also as a strain relief bracket for the liquid supply line 55 which will be connected to the valve 20.

FIG. 3 shows a cross-sectional view of the valve 20 which helps to illustrate how the valve 20 can be stack assembled so that all the components and subassemblies are installed in the same direction to aid in automated assembly of the valve. In describing the assembly process, the components of the valve will also be identified. The valve is essentially assembled upside down. Therefore, in assembly the coil 22 is placed within frame 26 and both components are placed within a nest. The guide tube assembly 66 is placed in a longitudinally extending aperture 68 in the coil 22. The guide tube assembly 66 has a flange 70 extending therearound which prevents the tube from sliding too far into the aperture 68. A spring 72 and a magnetically responsive armature 74 are then placed within an aperture 76 in the guide tube assembly 66 so that magnetically responsive armature 74 will respond to magnetic fields induced by pole pieces 78 and 80 of the coil 22. The magnetically responsive armature has a sealing component 82 to sealingly engage valve seat 84 located within the valve body 24. The guide tube body 66 has a step shaped outside diameter, as illustrated in FIG. 3 to allow seals such as O-rings 86 and 88 to be placed around the guide tube to prevent leakage between the guide tube assembly 66 and the valve body 24. Valve body 24, having typical inlet water channels 90 and outlet water channels 92 integrally formed therein, is then inserted over the guide tube assembly 66 so that the armature 74 may interrupt flow between the inlet 90 and outlet 92 channels by sealingly engaging the valve seat 84. Standard solenoid valve components such as a washer 94, a flow control 96, another washer 98, and a screen 100, are then placed within the valve body 24. The valve body 24 has an appropriately stepped internal construction along the inlet water channel 90 to provide for seating of these various components.

At the inlet end 38 of the valve body 24, the inside diameter of the valve body is sized to snugly receive the outside diameter of inlet 56 which is inserted therein. The portion 102 of the inlet inserted into the valve body has a pair of annular grooves 104 and 106 extending therearound to permit seals 108 and 110 to be inserted within the annular grooves 104 and 106 to prevent water leakage. Inlet 56 is provided with a quick connect/disconnect standard inlet nut component such as a FAST & TITE ® thermoplastic fitting 112. Therefore the inlet 56 is externally threaded to receive an internally threaded cap or nut 114. Within the interior of the quick disconnect fitting 112 are seals 116, a grip ring 118 and a spacer 120 so that the outside surface of a water inlet line 55 may be sealingly secured within the inlet upon tightening of the nut 114.

As can be seen from FIGS. 2, 3 and 4, upon assembly, the electrical connectors 122 of the coil 22 are in a fixed spatial relationship to the water outlet tube 124 of the valve body. As is illustrated, there are two electrical connectors 122 which are connected in a standard fashion to the coil 22. The fixed spatial relationship between the electrical connectors 122 and the water outlet tube 124 allow for the electrical connections and fluid connections to be made simultaneously by a single pushing motion in the direction of the longitudinal axis 126 of the connecting tube 124. Electrical connectors 122 are illustrated as spade-type connectors pointing in the same direction as longitudinal axis 126 of the water outlet tube 124. Water outlet tube 124 has annular grooves 127 within which O-rings 128 are held to provide a seal upon connection to the refrigerator.

FIG. 2 illustrates the valve 20 connected to an appliance shown generally as 130. Refrigerator 130 has an icemaker which requires a water supply at intermittent intervals. Therefore, refrigerator 130 has a point of liquid supply need 132 and a means for generating an electrical signal to indicate the need for liquid supply 134. The point of liquid supply need 132 is in fluid connection by a line 136 with a female fluid connector tube 138 having an inside diameter 140, which is slightly greater than the outside diameter 142 of the water outlet tube 124. The signal generator means 134 is connected by wires 144 (only one shown) to a pair of female electrical connectors 146 (only one shown) which are designed to receive electrical connectors 122. Female electrical connectors 146 and female fluid connector 138 are held within the same fixed spatial relationship as electrical connectors 122 and the water outlet tube 124 of the valve 20 in an appropriate manner. As illustrated in FIG. 2, the fixed spatial relationship between the female electrical connectors and the female fluid connector may be achieved by forming the connectors within a single socket 148 which is attached by linear fasteners 150 and 152 to a wall 62 of the appliance. However, it should be understood that the electrical connectors and female fluid connector 138 need not be formed integrally within a socket, but may be held within the fixed spatial relationship by any appropriate bracket. Thus, female fluid connector 138 could simply be the inside diameter of the water supply line 136.

In attaching the valve 20 to the appliance 130, the electrical connector 122 and water outlet tube 124 are aligned with their appropriate female electrical connectors 146 and female fluid connector 138 and then a force toward the refrigerator along the longitudinal axis 126 is applied to the valve so that the fluid connections and electrical connections are simultaneously made. Upon applying this force, the electrical connectors 122 separate the prongs of the female electrical connectors 146 as the water outlet tube 124 slides into the female fluid connector 138 causing compression of seals 128 to provide a fluid seal between the outside diameter 142 of tube 124 and the inside diameter 140 of female fluid connector 138. The valve may then be secured to the appliance wall by linear fasteners 36 and/or 60 extending through brackets 32 and relief bracket 40. Connection to an external liquid supply such as a household water supply line is then affected by inserting a liquid supply line 55 through the water line inlet hole 52 and into the quick connect/disconnect fitting 112 whereupon the nut is tightened to seal the water line within the valve.

One further feature of the present invention is that electrical grounding of the coil 22 to the refrigerator 130 may be accomplished upon insertion of linear fasteners 36 into the bracket 32 and into the wall 62 of the refrigerator. This grounding is affected because the frame 26 is made of a magnetic and conductive material such as steel and the plate 32 is likewise made of a conductive material and the frame and the plate are in contact with one another upon assembly. Therefore, transient electrical signals from the coil 22 can travel through the frame 26 through the plate 32 and through the linear fasteners 36 to the wall 62 of the refrigerator and thereby be grounded.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An improved solenoid operated valve assembly for use with a refrigerator with an icemaker comprising;
    a liquid supply connector in said refrigerator connected to the site of liquid requirement;
    an electrical connector in said refrigerator connected to electrical liquid requirement indicator means for providing an electrical signal during the period when the refrigerator requires a liquid, said electrical connector being in a fixed spacial relationship to said liquid supply connector;

a valve body comprising:

a liquid supply intake connectable to a supply of liquid;

a liquid supply output connector designed and arranged to sealingly connect with said liquid supply connector of said refrigerator, said liquid supply output connector being connected to a fluid path connecting said output connector to said liquid supply intake;

a solenoid operated valve movably positioned in the fluid path to open and close said fluid path;

a second electrical connector electrically communicating with said solenoid operated valve so that an electrical signal received by said electrical connector will supply an impulse to cause said valve to selectively open and close said fluid path, said second electrical connector being electrically connectable to said first electrical connector, said second electrical connector being in a second fixed spacial relationship to said liquid supply intake connector such that said second fixed spacial relationship is the same as said first fixed spacial relationship;

wherein said liquid supply connector is connected to said liquid supply output connector and said first electrical connector is connected to said second electrical connector; and said device further comprising an attachment means for attaching said valve body to said refrigerator while simultaneously grounding said solenoid to said refrigerator and relieving strain on a line connecting said supply of liquid to said liquid supply intake.

2. The device of claim 1 wherein said water supply connector has internal walls defining a connection aperture having a definite shape and dimension and wherein said water supply output connector has external walls defining a connection tube having the same shape as the connection aperture and dimensions slightly smaller than the connection aperture, said water supply output connector further comprising sealing means extending around said external walls for providing a watertight seal between said internal walls and said external walls when said water supply outlet connector is received in said water supply connector.

3. The device of claim 2 and further comprising unidirectional simultaneous connection means for providing simultaneous connection between said liquid supply connector and said liquid supply output connector and between said electrical connector and said second electrical connector by a single force applied to said valve body in a single direction and a unidirectional simultaneous disconnection means for providing simultaneous disconnection between said liquid supply connector and said liquid supply output connector and between said electrical connector and said second electrical connector by a single force applied to said valve body in a single direction.

4. The device claim 1 wherein said liquid supply intake is of the quick connect/disconnect type.

5. A method of providing a solenoid operated valve for a refrigerator with an icemaker comprising the steps of:

providing a refrigerator with an icemaker and a liquid connector in a fixed spacial relationship to an electrical connector both of which communicate with the icemaker;

providing a solenoid operated valve with a liquid supply intake and having a second liquid connector in the same fixed spacial relationship to a second electrical connector as the fixed spacial relationship of the connectors in the refrigerator;

simultaneously connecting said liquid connectors and said electrical connectors; and securing the valve to the refrigerator with a fastener while simultaneously grounding said solenoid to said refrigerator and relieving strain in a line connecting said supply of liquid to said liquid supply intake.

6. The method of claim 5 and further comprising the steps of:

simultaneously disconnecting said liquid connectors and said electrical connectors;

replacing said solenoid operated valve with another solenoid operated valve having a second liquid connector in the same fixed spacial relationship to a second electrical connector as the fixed spacial relationship of the connectors in the refrigerator;

repeating said simultaneous connecting step with the replacement valve.

7. The method of claim 5 wherein said simultaneous connection step comprises the steps of;

aligning said second electrical connector with said first electrical connector;

aligning said second liquid connector with said first liquid connector; and, pushing against said valve to simultaneously connect the electrical connectors and the liquid connectors.

8. The method of claim 5 and further comprising the steps of;

simultaneously disconnecting said liquid connectors and said electrical connectors;

replacing said solenoid operated valve with another solenoid operated valve having a second liquid connector in the same fixed spacial relationship to a second electrical connector as the fixed spacial relationship of the connectors in the refrigerator;

repeating said simultaneous connecting step with the replacement valve.

* * * * *